United States Patent
Heydel et al.

(10) Patent No.: US 11,548,397 B2
(45) Date of Patent: Jan. 10, 2023

(54) ELECTRIC POWERTRAIN WITH BATTERY SYSTEM HAVING A THREE-STATE HIGH-VOLTAGE CONTACTOR

(71) Applicant: GM GLOBAL TECHNOLOGY OPERATIONS LLC, Detroit, MI (US)

(72) Inventors: Robert J. Heydel, Clawson, MI (US); Christopher Schlaupitz, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 353 days.

(21) Appl. No.: 17/036,460

(22) Filed: Sep. 29, 2020

(65) Prior Publication Data

US 2022/0097536 A1    Mar. 31, 2022

(51) Int. Cl.
| | |
|---|---|
| *B60L 50/60* | (2019.01) |
| *B60L 53/10* | (2019.01) |
| *H01M 10/04* | (2006.01) |
| *H02J 7/00* | (2006.01) |
| *B60L 53/16* | (2019.01) |

(52) U.S. Cl.
CPC ............ *B60L 50/66* (2019.02); *B60L 53/11* (2019.02); *B60L 53/16* (2019.02); *H01M 10/0445* (2013.01); *H02J 7/0024* (2013.01); *H01M 2220/20* (2013.01)

(58) Field of Classification Search
CPC .......... B60L 50/66; B60L 53/11; B60L 53/16; H01M 10/0445; H01M 2220/20; H02J 7/0024
USPC ........................................................ 320/117
See application file for complete search history.

(56) References Cited

U.S. PATENT DOCUMENTS

| | | | |
|---|---|---|---|
| 10,770,908 B2 * | 9/2020 | Verbridge | H01M 50/269 |
| 11,336,101 B2 * | 5/2022 | Hao | B60L 53/11 |
| 2012/0206101 A1 * | 8/2012 | Shilimkar | H02J 7/00 320/112 |
| 2019/0225096 A1 * | 7/2019 | Hiroe | B60L 50/66 |
| 2019/0283611 A1 * | 9/2019 | Conlon | B60L 53/14 |
| 2020/0227796 A1 * | 7/2020 | Miki | H01M 10/6556 |
| 2020/0276966 A1 * | 9/2020 | Rich | H02J 7/34 |

(Continued)

FOREIGN PATENT DOCUMENTS

| | | | |
|---|---|---|---|
| DE | 102021202408 A1 * | 9/2022 | |
| DE | 102014106720 B4 * | 10/2022 | H01M 10/425 |

(Continued)

*Primary Examiner* — Suresh Memula
(74) *Attorney, Agent, or Firm* — Quinn IP Law

(57) ABSTRACT

A three-state contactor for an electrical system having a battery pack and voltage bus rail includes first and second pairs of electrical terminals. The first pair of terminals is separated by a first circuit gap in a first circuit path extending between the bus rail and an electrode terminal of the battery pack. The second pair of terminals is separated by a second circuit gap in a second circuit path extending between the bus rail and electrode terminal. A contactor arm, in response to a corresponding switch activation signal, translates in an orthogonal direction with respect to its longitudinal axis between a first ON state position, an OFF position, and a second ON position to close the first circuit gap, open both circuit gaps, or close the second circuit gap, respectively. A multi-pack battery system and an electric powertrain may use the contactor.

20 Claims, 4 Drawing Sheets

(56) References Cited

U.S. PATENT DOCUMENTS

| | | | | |
|---|---|---|---|---|
| 2020/0324719 A1* | 10/2020 | Mahmoud | ............... | H02J 9/061 |
| 2021/0245622 A1* | 8/2021 | Wang | ................... | H02J 7/0013 |
| 2022/0097538 A1* | 3/2022 | Heydel | ................... | B60L 53/16 |
| 2022/0097563 A1* | 3/2022 | Heydel | ................. | H02J 7/0019 |
| 2022/0219554 A1* | 7/2022 | Cui | ......................... | B60L 53/10 |
| 2022/0239114 A1* | 7/2022 | Hao | ..................... | H02J 7/0024 |

FOREIGN PATENT DOCUMENTS

| | | | | |
|---|---|---|---|---|
| WO | WO-2019082776 A1 * | 5/2019 | ................ | B60L 3/00 |
| WO | WO-2019120589 A1 * | 6/2019 | ............. | B60L 53/11 |
| WO | WO-2021092658 A1 * | 5/2021 | | |
| WO | WO-2022113918 A1 * | 6/2022 | | |

\* cited by examiner

| | SA1 | 40/K1 | SA2 | SA3 | 140/K2 | SB2 | SB3 | S-A | S-B |
|---|---|---|---|---|---|---|---|---|---|
| PSA | X | X | X | O | X | X | O | O | O |
| DCFC-S | X | X | O | X | X | X | X | X | X |
| DCFC-P | X | X | X | X | X | X | X | O | O |

US 11,548,397 B2

ELECTRIC POWERTRAIN WITH BATTERY SYSTEM HAVING A THREE-STATE HIGH-VOLTAGE CONTACTOR

INTRODUCTION

The present disclosure relates to a high-voltage battery system of the type used to power propulsion functions aboard a battery electric vehicle ("BEV"), hybrid electric vehicle ("HEV"), or other mobile platform, as well as to an electric powertrain having such a battery system. More particularly, the disclosure pertains to a battery system and electric powertrain having one or more high-voltage contactors constructed and operating as set forth herein to provide mutually-exclusive circuit path connections within the battery system and electric powertrain.

An electric powertrain typically includes one or more polyphase/alternating current (AC) rotary electric machines constructed from a wound stator and a magnetic rotor. Individual phase leads of the electric machine are connected to a power inverter, which in turn is connected to a direct current (DC) voltage bus. When the electric machine functions as a traction or propulsion motor, control of the individual ON/OFF switching states of various semiconductor switches housed within the power inverter generates an AC output voltage at a level suitable for energizing the electric machine. The energized phase windings ultimately produce a rotating magnetic field that interacts with a rotor field to produce machine rotation and motor output torque.

A multi-cell DC battery pack forms a core part of a battery system, with the latter also referred to as a rechargeable energy storage system (RESS). The battery pack, which is connected to the DC voltage bus, may be selectively recharged in some battery systems using an off-board charging station. When the charging station produces a charging voltage having an AC waveform, an AC-DC converter converts the AC charging waveform to a DC waveform suitable for charging the constituent battery cells of the battery pack. Alternatively, a DC fast-charging ("DCFC") station may be used to deliver high-voltage DC charging waveform as a relatively high-power/high-speed charging option.

SUMMARY

A three-state high-voltage contactor is disclosed herein, along with a battery system using the same. Also disclosed is an electric powertrain inclusive of the battery system and contactor, with a multi-pack embodiment of the battery system including two or more series/parallel-connectable battery packs each inclusive of one or more of the contactors.

As appreciated in the art, automotive-grade high-voltage contactors are typically available in a basic two-terminal/ON-OFF configuration. Achieving two mutually-exclusive switching states with such contactors when connecting two electrical circuits in certain areas of a high-voltage battery system requires the use associated controls and diagnostic algorithms in order to ensure that the two contactors cannot both be in a conducting/ON state at the same time. This particular circuit design and control concern is addressed by the contemplated three-state contactor of the present disclosure, which provides two mutually-exclusive ON states connecting two circuit paths in a mutually-exclusive manner, and which provides an OFF state in which both of the circuit paths are disconnected. At the same time, the present teachings eliminate one of the previously-required two-terminal contactors noted above to decrease overall circuit complexity and associated costs.

In a non-limiting exemplary embodiment of the present battery system, the battery system may include a voltage bus rail, a battery pack connectable to an electrical load and having an electrode terminal, and the three-state contactor, with the latter being positioned between the voltage bus rail and the electrode terminal of the battery pack. For instance, the voltage bus rail and the electrode terminal may be a positive bus rail and a positive/cathode electrode terminal, respectively.

The three-state contactor includes a first pair of electrical terminals separated from each other by a sufficient arc-proof distance referred to herein as a first circuit gap, which lies in or along a first circuit path. The first circuit path extends between the voltage bus rail and the electrode terminal. Additionally, a second pair of electrical terminals is separated from each other by a second circuit gap in or along a second circuit path between the voltage bus rail and the same electrode terminal. An elongated conductive contactor arm is configured, in response to a corresponding switch activation signal, to translate in an orthogonal direction with respect to a longitudinal axis of the contactor arm, i.e., as opposed to pivoting or swinging about one of its distal ends.

Translation of the contactor arm occurs between a first ON state position, i.e., a switch position corresponding to an ON/conducting state, in which the contactor arm is coaxial with the first circuit path. The contactor arm in the ON/conducting state position thus closes the first circuit gap to thereby connect the voltage bus rail to the electrode terminal through or along the first circuit path. In an OFF state position between the first circuit and second circuit paths, the first and second circuit gaps remain open. A second ON state position exists in which the contactor arm is coaxial with the second circuit path to close the second circuit gap. Such a position connects the voltage bus rail to the electrode terminal through or along the second circuit path.

The first and second circuit paths may be parallel to each other in a typical arrangement, at least through the extent or footprint of the three-state contactor.

The first pair of electrical terminals and the contactor arm may together form a pre-charge switch within the battery pack in some embodiments, with the battery pack in certain configurations having a voltage capability of at least 400V.

The battery system may be optionally configured as a multi-pack battery system having first and second battery packs. In such an embodiment, a first three-state contactor may be connected to the first battery pack, while another three-state contactor may be connected between the voltage bus rail and an electrode terminal of the second battery pack.

Some embodiments of the present battery system may include a plurality of high-voltage electrical switches inclusive of the first and second three-state contactors. The high-voltage electrical switches are collectively configured to selectively interconnect the first and second battery packs in a series battery configuration to provide a first pack voltage, e.g., 800V in a possible non-limiting implementation, and a parallel battery configuration to provide a second pack voltage, e.g., 400V, during series or parallel battery operating modes of the battery system, respectively.

The battery system, inclusive of the first and second three-state contactors, may have a total of eight high-voltage electrical switches.

An electronic control unit ("controller") may be coupled to the eight high-voltage switches and configured, in response to a battery mode selection signal, to selectively control a respective ON/OFF state of each of the switches to thereby transition the multi-pack battery system from the series battery configuration to the parallel battery configuration, or vice versa.

The battery system may include a DC charge coupler configured to connect the battery pack to an offboard DC charging station during a DC fast-charging (DCFC) event.

An electric powertrain is also disclosed herein. In a disclosed embodiment, the electric powertrain includes a mechanical load, an electrical load inclusive of a rotary electric machine connected to a power inverter module (PIM) and coupled to the mechanical load, and the battery system summarized above. The battery system is connected to and configured to power the electrical load.

An embodiment of the three-state contactor includes a first pair of electrical terminals separated from each other by a first circuit gap in/along a first circuit path extending, when the contactor is in an installed position in the electrical system, between the voltage bus rail and an electrode terminal of the battery pack. A second pair of electrical terminals is separated from each other by a second circuit gap in a second circuit path extending, in the installed position, between the voltage bus rail and the electrode terminal. A contactor arm is configured, in response to a corresponding switch activation signal, to translate in an orthogonal direction with respect to its own longitudinal axis.

Translation of the contactor arm, as noted above, occurs between a first ON state position in which the contactor arm closes the first circuit gap to connect the voltage bus rail to the electrode terminal of the battery pack through the first circuit path, an OFF state position lying between the first and second circuit paths in which the first and second circuit gaps remain open, and a second ON state position in which the contactor arm closes the second circuit gap to connect the voltage bus rail to the electrode terminal through the second circuit path.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
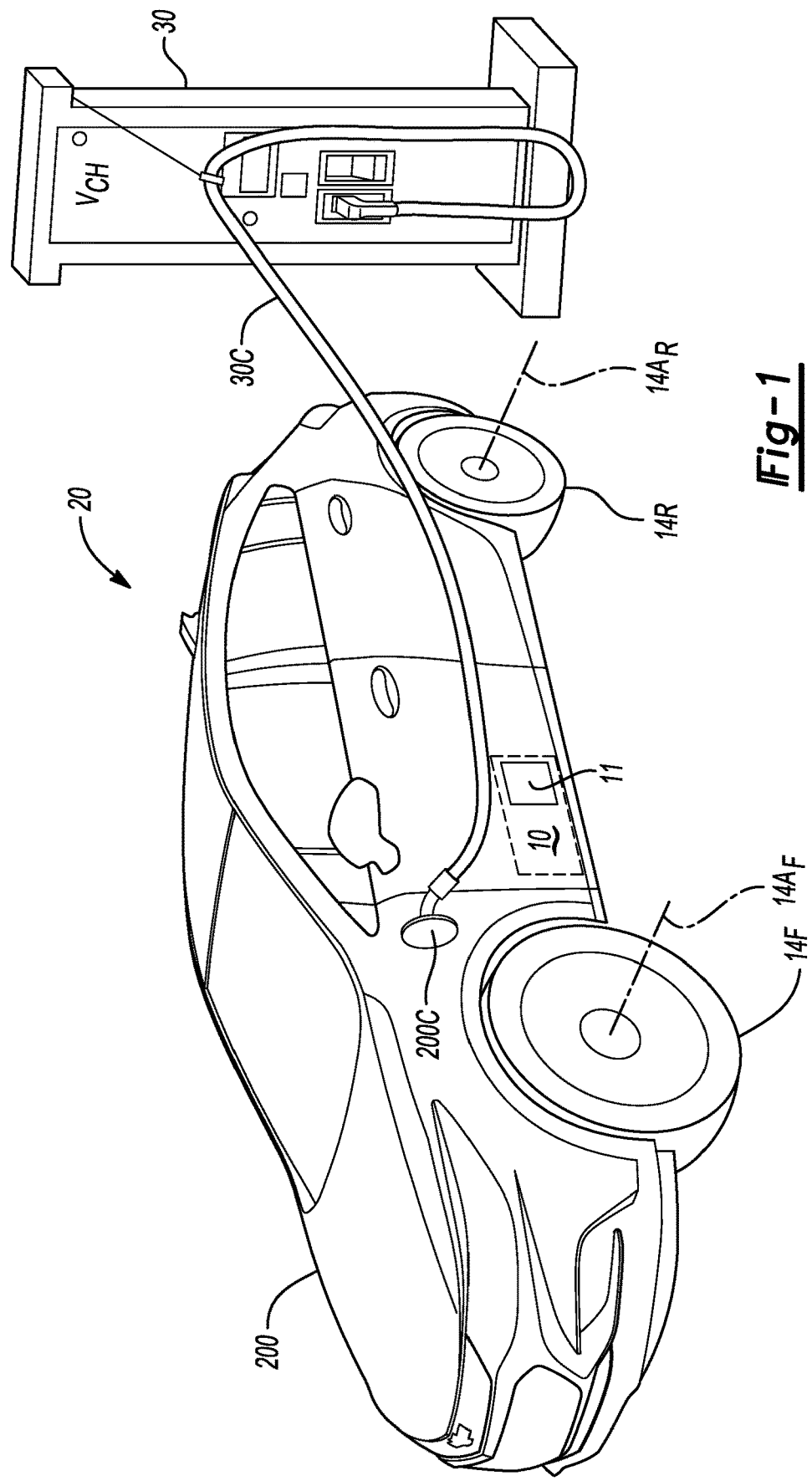
FIG. 1 is a schematic illustration of an exemplary motor vehicle undergoing a direct current (DC) fast-charging operation, with the motor vehicle having a high-voltage battery system and at least one three-state contactor providing mutually-exclusive circuit connections and a separate OFF state as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 3:
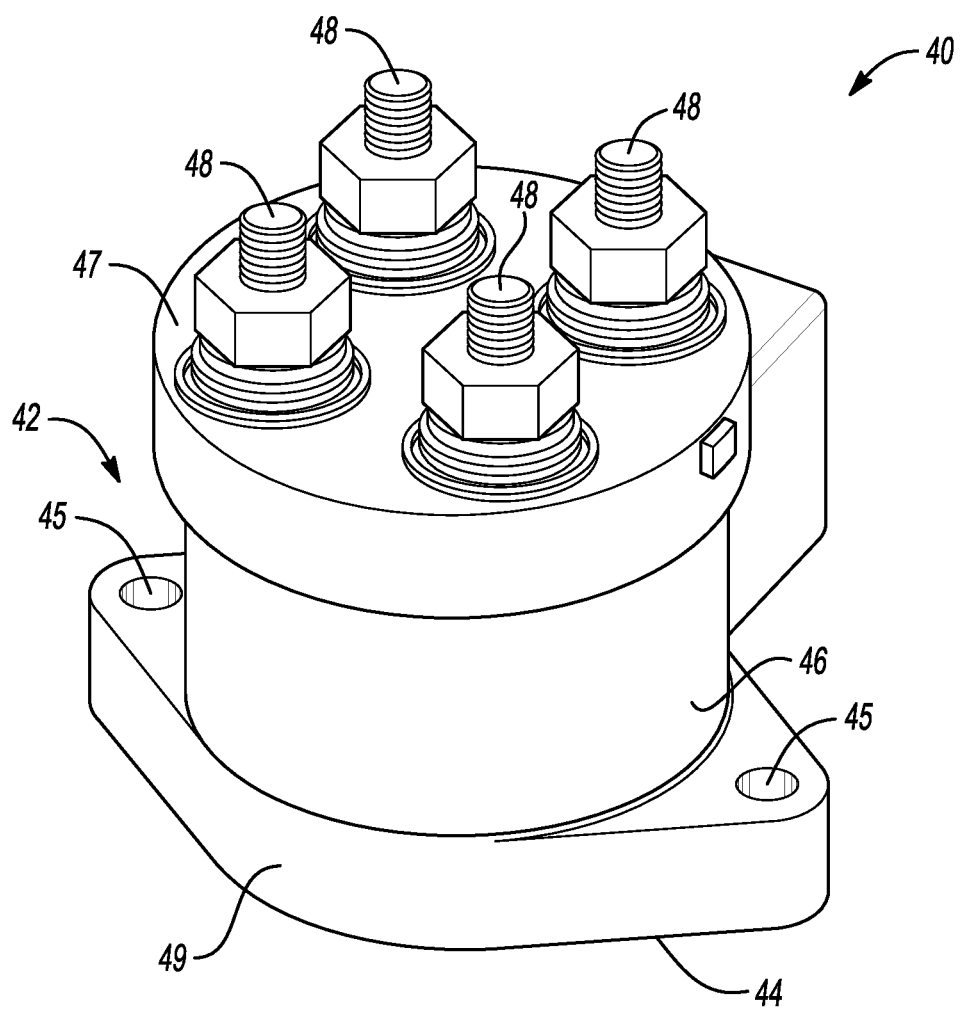
FIG. 3 is a schematic perspective view of a representative three-state contactor in accordance with the disclosure.
Figures 4, 6:
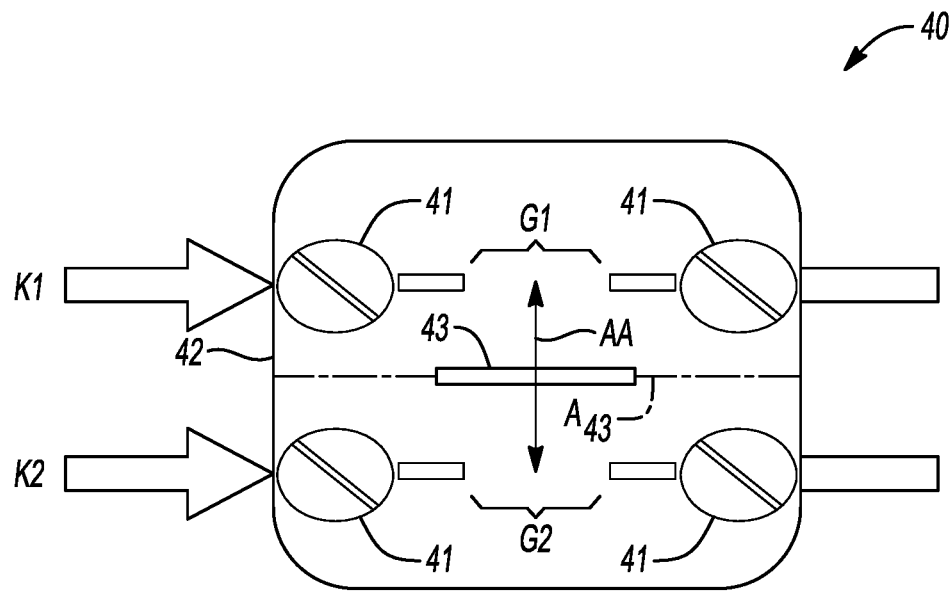
FIG. 4 is a schematic plan view illustration of the three-state contactor shown in FIG. 3.
FIG. 6 is a truth table depicting the ON/OFF states of the three-state contactors and remaining high-voltage switches shown in FIG. 5.

Referring to the drawings, wherein like reference numbers refer to the same or like components in the several Figures, an electric powertrain 10 is shown in FIG. 1. The electric powertrain 10 includes a battery system 11 having one or more three-state high-voltage contactors 40, an exemplary embodiment of which is depicted in FIGS. 3 and 4. As described in detail below, the contactor 40 includes four electrical terminals 41 arranged in two terminal pairs to provide a pair of mutually-exclusive ON/conducting state positions and an OFF/non-conducting state position. When used in the battery system 11, e.g., at the indicated circuit locations in FIG. 5, the contactor(s) 40 eliminate the need for associated controls and diagnostic checks, circuit redundancy, and associated costs of implementing similar circuit connections using dual-state contactors of the types noted briefly above and well understood in the art.

The electric powertrain 10 shown in FIG. 1 may be used as part of a motor vehicle 20 or other mobile system having a vehicle body 200. In such an embodiment, the vehicle body 200 is connected to a set of road wheels 14F and 14R, with "F" and "R" in this instance referring to the respective front and rear positions of drive axles $14A_F$ and $14A_R$ on which the road wheels 14F and 14R are respectively disposed. The motor vehicle 20 may be alternatively embodied as a marine vessel, aircraft, rail vehicle, robot, or other mobile platform, and therefore the present teachings are not limited to vehicular applications in general or automotive vehicles in particular.

The motor vehicle 20 is depicted in FIG. 1 while undergoing a direct current fast-charging (DCFC) operation. During such an operation, the battery system 11 is electrically connected to an off-board DC fast-charging charging station ($V_{CH}$) 30 via a vehicle charging port 200C internally coupled to the battery system 11 via the DC charge connector 65 of FIG. 5. The electric powertrain 10 uses multiple battery packs, with two such battery packs shown as first and second battery packs 12A and 12B in FIG. 5. The battery system 11 may be variously embodied as a multi-cell lithium ion, zinc-air, nickel-metal hydride, or other suitable battery chemistry configuration.

Figure 5:
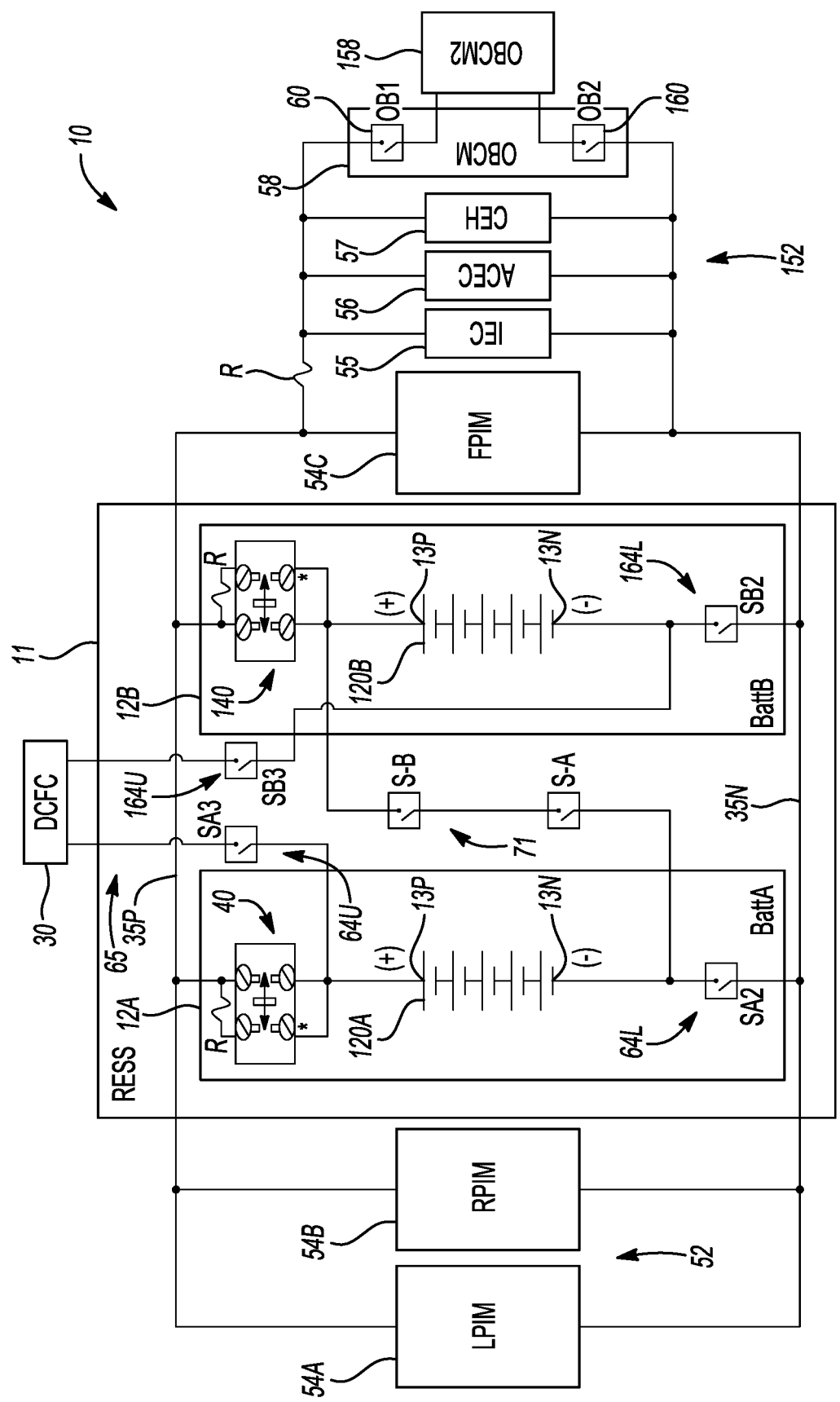
FIG. 5 is a schematic eight-switch circuit diagram for implementing portions of an electric powertrain using two of the three-state contactors of FIGS. 3 and 4, e.g., as part of an electric powertrain of the motor vehicle shown in FIG. 1.

The exemplary architecture described herein with reference to FIG. 5 enable improved utilization of a charging voltage from the charging station 30 at different voltage levels when the battery system 11 is optionally configured as a multi-pack battery system 11 as shown in FIG. 5. For instance, the motor vehicle 20 may be propelled at a parallel voltage level, e.g., 400-500V in a possible propulsion system-suitable configuration, and then reconfigured during charging to receive a charging voltage at a higher series voltage level, e.g., 800-1000V in this non-limiting example embodiment. Other voltage levels may be contemplated within the scope of the disclosure, and thus 400V and 800V examples are non-limiting.

As will be appreciated by those of ordinary skill in the art, the various propulsion modes enabled by the architectures described herein may include all-wheel drive ("AWD"), front-wheel drive ("FWD"), or rear-wheel drive ("RWD") propulsion modes depending on battery power, control configurations, and possibly other relevant factors. Likewise, the present teachings enable independent propulsion of the road wheels 14R relative to each other, i.e., a left-side/driver-side road wheel 14R may be independently powered by the electric powertrain 10 as set forth below. Another embodiment may encompass propulsion at the higher/combined voltage level of the first and second battery packs 12A and 12B of FIG. 5 in a series arrangement, and charging at either the higher/combined or lower/parallel voltage levels depending on the available maximum charging voltage from the charging station 30.

In FIG. 1, the charging port 200C is internally connected to a DC charge connector 65 (FIG. 5) of/coupled to the battery system 11, with the charging port 200C connected to the charging station 30 using a length of high-voltage charging cable 30C. Although not depicted in FIG. 1, but well understood in the art, a terminal end of the charging cable 30C configured to connect to the charging port 200C may be embodied as an SAE J1772 or another suitable charge connector. However, the present teachings are independent of the particular charging standard ultimately employed in a DCFC operation, and therefore the above-noted examples are merely illustrative.

Figure 2:
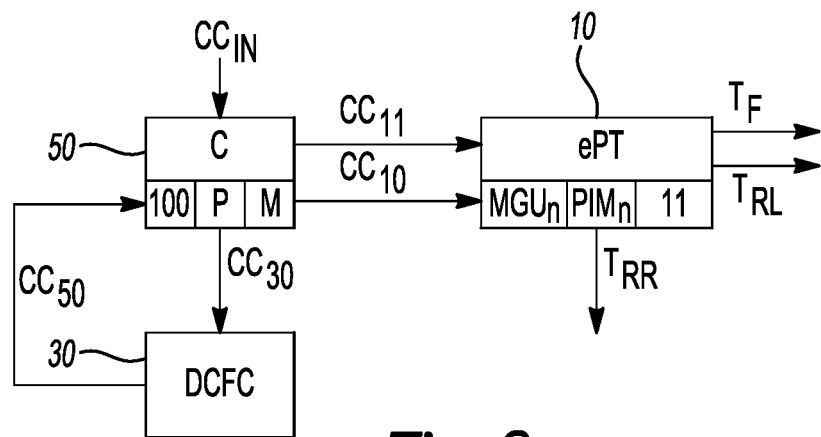
FIG. 2 is a schematic flow diagram depicting a controller of the motor vehicle of FIG. 1 in communication with an offboard DC fast-charging station and an electric powertrain of the motor vehicle.

Referring briefly to FIG. 2, the electric powertrain (ePT) 10 includes an electronic control unit or controller (C) 50 configured to control powerflow operations aboard the motor vehicle 20 shown in FIG. 1. Accordingly, the controller 50 is configured to receive input signals (arrow $CC_{IN}$) from various sensors or other control units (not shown), and to execute instructions 100 in response to the input signals (arrow $CC_{IN}$) to perform the indicated switching control functions enabling charging or propulsion, including implementing the states of table 70 shown in FIG. 6 and explained below.

In the broad scope of possible operations, the input signals (arrow $CC_{IN}$) may include any number of possible values, e.g., temperature, commanded and estimated operating speed, switch activation signals, required charging power, current state of charge, etc. In response, the controller 50 may transmit control signals (arrows $CC_{10}$ and $CC_{11}$) to the respective electric powertrain 10 and battery system 11 thereof to ensure that the electric powertrain 10 allocates front and/or rear torque (arrows $T_F$ and $T_{RR}$, $T_{RL}$) to the front and/or rear axles $14A_F$ or $14A_R$, or to the individual road wheels 14F or 14R connected thereto. Likewise, the control signals may encompass transmitted charging control signals (arrow $CC_{30}$) and received feedback signals (arrow $CC_{50}$) in a two-way communication with the DC fast-charging (DCFC) station 30 during a DC fast-charging session. That is, the input signals (arrow $CC_I$) may include an available charging voltage from the charging station 30, which may be determined during charging as part of ongoing communication between the controller 50 and the charging station 30, e.g., upon connection of the motor vehicle 20 to the charging station 30, as will be appreciated by those of ordinary skill in the art.

In terms of its hardware configuration, the controller 50 of FIG. 2 includes a processor (P) and memory (M). The memory (M) includes tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute the instructions 100 during charging and propulsion modes, as noted above, which includes performing switching control operations of the specific switches described below with reference to FIG. 5.

The controller 50 is in communication with the various controlled components of the electric powertrain (ePT) 10 via a suitable communications framework and protocol, e.g., a controller area network (CAN) bus or other differential voltage signal lines. Receipt of the signals (arrows $CC_{10}$ and $CC_{11}$) by associated components of the electric powertrain 10 and battery system 11 causes one or more (i.e., "n") motor-generator units (MGUn), each coupled via a respective power inverter modules (PIMn), to a rechargeable energy storage system (RESS), i.e., the battery system 11, to generate the indicated motor torques (arrows $T_F$, $T_{RL}$, $T_{RR}$), with the latter two values, i.e., $T_{RL}$ and $T_{RR}$, corresponding to torque provided to the right-side and left-side rear road wheels 14R in an exemplary embodiment in which the rear road wheels 14R are independently driven via a corresponding wheel motor. As appreciated in the art, the motor-generator units (MGUn) may be configured as high-voltage electric traction or propulsion motors, e.g., polyphase/alternating current (AC) traction motors having a concentric stator and rotor (not shown), with the rotor being connected directly or indirectly to one or more of the road wheels 14F and/or 14R.

An exemplary automotive-grade implementation of the present three-state contactor 40 is depicted in FIG. 3. A housing 42 in this embodiment includes a planar base 49 defining through-holes 45 and having a flat undersurface 44 facilitating mounting of the contactor 40 to a substrate, e.g., of the battery system 11 of FIGS. 1 and 5 in the present disclosure. A generally cylindrical contactor body 46 may protrude from the base 44 and contain four electrical terminals 41 (see FIG. 4). The contactor body 46 may be connected/potted to an end cap 47, which in turn is secured to the contactor body 46 by a set of fasteners 48 having axial locations coinciding with the electrical terminals 41 of FIG. 4.

Referring to FIG. 4, the three-state contactor 40 is shown in a schematic plan view to illustrate the mutually-exclusive switching functionality thereof. As shown, the contactor 40 includes a first pair of electrical terminals 41 separated from each other by a first circuit gap G1 in or along a first circuit path K1. In an installed position within the battery system 11 of FIG. 5, for instance, the contactor 40 may be positioned between a respective positive or negative voltage bus rail 35P or 35N and a corresponding positive or negative electrode terminal 13P or 13N of the first or second battery pack 12A or 12B. A second pair of electrical terminals 41 in FIG. 4 is separated from each other by a second circuit gap G2 in/along a second circuit path K2 likewise extending, when the contactor 40 is in the installed position, between the voltage bus rail 35P or 35N and the electrode terminal 13P or 13N of FIG. 5.

The three-state contactor 40 includes an elongated contactor arm 43 having a longitudinal axis $A_{43}$. The contactor arm 43A is configured, in response to a corresponding switch activation signal transmitted as part of the input signals (arrow $CC_{IN}$ of FIG. 2), to translate in an orthogonal direction (arrow AA) with respect to the longitudinal axis $A_{43}$ between mutually-exclusive first and second ON state positions and a single OFF position.

In the first ON state position, the contactor arm 43 is coaxial with the first circuit path K1 and its electrical terminals 41, and thus fills and closes the first circuit gap G1. This action electrically connects the voltage bus rail 35P or 35N to the electrode terminal 13P or 13N, respectively, through the first circuit path K1. The OFF state position lies in the range of motion lying between the respective first and second circuit paths K1 and K2, with the OFF state position corresponding to a state in which the first and second circuit gaps G1 and G2 remain open. The second ON state position is established when the contactor arm 43 closes the second circuit gap G2 to connect the voltage bus rail 35P or 35N to the respective electrode terminal 13P or 13N through the second circuit path K2.

The three-state contactor 40 may be used as part of the example battery system 11 shown in FIG. 5 to establish mutually-exclusive K1 and K2 circuit connections at particular locations of the battery system 11, with first and second circuit paths K1 and K2 being parallel through the contactor 40 in the exemplary embodiments. The mutually-exclusive ON state positions make it impossible to simultaneously pass a battery current from the battery system 11 through both of the first and second circuit paths K1 and K2. As a further benefit, the use of a single contactor 40 at the indicated locations in FIG. 5 reduces the number of total switches required for constructing the battery system 11 to eight, rather than using ten or more switches when implementing such first and second circuit paths K1 and K2 using two-state contactors and the associated control and diagnostic logic attendant thereto, as noted above.

The controller 50 of FIG. 2 performs switching control of the battery system 11 to ultimately generate and deliver motor torque to the road wheels 14F and/or 14R and thereby propel the motor vehicle 20. In a charging operation, the controller 50 may likewise perform switching control operations to provide one of a number of possible charging modes. The controller 50 is thus optionally configured to select between series or parallel battery arrangements and corresponding charging modes. Additionally, certain locations in the battery system 11 may require performance of pre-charging operations when transitioning between charging and propulsion modes using parallel switch arrangements, as is well understood in the art. In such cases, the construction of the three-state contactor 40 depicted in FIGS. 3 and 4 facilitates such connections in a simpler, less control-intensive, and mutually-exclusive manner.

Referring to FIG. 5, the battery system 11 in a multi-pack variant, when functioning as a rechargeable energy storage system (RESS), may include the first and second battery packs 12A (BattA) and 12B (BattB) arranged between and connected to/across positive (+) and negative (−) rails 35P and 35N of a high-voltage bus. The battery packs 12A and 12B have corresponding positive (+) and negative (−) battery terminals 13P and 13N, and together or alone power an electrical load 52 and/or 152.

Representative electrical loads 52 and 152 may include one or more high-voltage devices, such as but not limited to one or more power inverter modules 54A and 54B (electrical load 52) and 54C (electrical load 152), integrated power electronics (IEC) 55, an air conditioning electric compressor (ACEC) 56, a cabin electric heater (CEH) 57, and one or more onboard charging modules (OBCM) 58 and (OBCM2) 158. When the OBCM2 158 is used, e.g., to selectively increase the charging rate/decrease charging time, switches 60 (OB1) and 160 (OB2) coupled to the positive and negative rails 35P and 35N may be used to selectively connect or disconnect the OBCM2 158 as needed.

With respect to the power inverter modules 54A, 54B, and 54C in particular, the illustrated battery system 11 enables various powertrain constructions to deliver power to the front road wheels 14F of FIG. 1, e.g., in a front wheel drive or all-wheel drive mode, or to deliver power to the rear road wheels 14R in a rear-wheel drive or AWD mode. When powering the rear road wheels 14R, the construction of FIG. 4 enables a left rear road wheel 14R and a right rear road wheel 14R to be separately or independently energized. In such an embodiment, a left power inverter module 54A (LPIM) and a right power inverter module 54B (RPIM) may be connected to a respective rotary electric machine as part of the overall electrical load 52, with such electric machines depicted schematically in FIG. 2 as MGUn. The power inverter module 54C in this embodiment may be a front power inverter module (FPIM) as shown.

As will be appreciated, operation of the various power inverter modules 54A, 54B, and 54C utilizes high-speed switching operations of dies of IGBTs, MOSFETs, and/or other applicable-suitable semiconductor switches each having an ON/OFF state controlled by the controller 50 via pulse-width modulation ("PWM"), pulse-density modulation ("PDM"), or another switching control technique. Auxiliary voltage-level batteries (not shown) and other devices may also be connected to the battery system 11 in a full implementation, with such devices and possible DC-DC converters omitted from FIG. 5 for illustrative simplicity.

The respective first and second battery packs 12A and 12B have respective cell stacks 120A and 120B, with the particular configuration and battery chemistry of the cell stacks 120A and 120B being application-specific, as noted above. The electrical load(s) 52 are selectively connected to/disconnected from the first battery pack 12A using upper and lower sets of high-voltage switches 64U and 64L, in a particular combination that depends on the present or requested operating mode. Similarly, the electrical load(s) 152 shown at far right in FIG. 5 are selectively connected to/disconnected from the second battery pack 12B via sets of upper and lower switches 164U and 164L. The various switches of FIG. 5 are depicted as simple binary ON/OFF switching devices for illustrative simplicity. In various embodiments, the switches may be electro-mechanical switches such as contactors or relays, which can block current flow in either direction. Alternatively, the switches may be configured as application-suitable solid-state switches or relays, e.g., semiconductor switches such as IGBTs or MOSFETs.

With respect to the upper and lower switches 64U and 64L of the first battery pack 12A, the individual upper switches 64U controlled herein include a switch SA3 connected to the DC charge connector 65 and the three-state contactor 40 with its first and second circuit paths K1 and K2 (see FIG. 4). A pair of the electrical terminals 41 and the contactor arm 43 of FIG. 4 may together form a pre-charge switch (*) within the battery pack 11, and thus a single contactor 40 may replace two parallel two-state switches used in a typical pre-charge circuit. That is, the second path K2 of FIG. 4 may correspond to the location of the pre-charge switch (*) in the first battery pack 12A. The three-state contactor 40 is in electrical series with a resistor R and connected to the positive terminal 13P of the first battery pack 12A. Lower switch 64L in this instance is labeled as switch SA2, which is connected to the negative electrode terminal 13N of the first battery pack 12A and the negative rail 35N.

The upper and lower switches 164U and 164L of the second battery pack 12B are similarly configured and labeled, i.e., as another three-state contactor 140 and a switch SB3 (analogous to switch SA3) forming the upper switches 164U. Contactor 140 likewise includes the first and second circuit paths K1 and K2 of FIG. 4, with the first circuit path K1 serving as the path for the pre-charge switch (*), and a switch SB2 forming the lower switches 164L of the second battery pack 12B between the negative electrode terminal 13N and the negative rail 35N.

FIG. 6 provides a table 70 describing ON/OFF state positions for the high-voltage switches shown in FIG. 5 for a "propulsion system active" (PSA) mode, a series-connected DC fast-charging (DCFC-S) mode, and a parallel-connected DC fast-charging (DCFC-P) mode. In table 70, an ON/conducting state position (X) indicates that the switch is commanded closed by the controller 50 of FIG. 2. Likewise, an OFF/non-conducting state position (O) indicates that the switch is commanded open. Thus, parallel-connected configurations of the first and second battery packs 12A and 12B, i.e., PSA and DCFC-P, both require that series switches S-A and S-B both be opened, with switches S-A and S-B being closed in the series-connected configuration of the first and second battery packs 12A and 12B.

With respect to the three-way contactors 40 and 140, these devices are closed for the three indicated modes, i.e., PSA, DCFC-S, and DCFC-P, with the first circuit path K1 established in the case of contactor 40 and the second circuit path K2 established in the case of contactor 140. Movement between the circuit paths K1 and K2 within the contactors 40 and 140 occurs based on the portion of a pre-charge cycle the battery system 11 is in, as will be appreciated by those skilled in the art, e.g., with contactor 40 closing the pre-charge switch (*) in the second circuit path K2 of FIG. 4 before transitioning to close circuit path K1, and the opposite sequence occurring in contactor 140. Switches SA1 and SB2 are likewise closed, while switches SA3 and SB3 are closed for the DC fast-charging modes and opened during propulsion.

In the illustrated exemplary circuit topology of FIG. 5, therefore, switches 64U, 64L, 164U, and 164L, along with three-state contactors 40 and 140, form a plurality of high-voltage switches collectively configured to selectively interconnect the first battery pack 12A and the second battery pack 12B in a series battery arrangement or a parallel battery arrangement during a series battery operating mode and a parallel battery operating mode, respectively. As part of such an approach, two series switches 71 configured as redundant two-position switches S-A and S-B may be connected between the negative electrode terminal 13N of the first battery pack 12A and the positive electrode terminal 13P of the second battery pack 12B, with the switches S-A and S-B opened when connecting the first and second battery packs 12A and 12B in parallel.

As will be appreciated by one of ordinary skill in the art, the circuit topology noted above may be used with electric vehicles and other systems having increased high-power charging requirements. With legacy DC fast-charging infrastructure generally on the order of 300-500V or less, the disclosed multi-pack embodiment of the battery system 11 enables use of two or more battery packs, e.g., the first and second battery packs 12A and 12B, to provide FWD, RWD, or AWD propulsion capability to the motor vehicle 20 of FIG. 1, with legacy or high-power charging both being options, and while preserving the capability of powering connected loads during charging.

In this context, the use of the three-state contactors 40 and 140 facilitates reliable switching between the first and second circuit paths K1 and K2 in areas of the battery system 11 having side-by-side or parallel switches, e.g., to implement charging or propulsion modes at lower or higher voltage levels, respectively. The mutually-exclusive construction of the contactors 40 and 140 preclude simultaneous connection of the first and second circuit paths K1 and K2, eliminate additional switches, and minimize associated control and diagnostic complexity. These and other potential benefits will be readily appreciated by those skilled in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery system comprising:
   a voltage bus rail;
   a battery pack connectable to an electrical load and having an electrode terminal; and
   a three-state contactor positioned between the voltage bus rail and the electrode terminal of the battery pack, wherein the three-state contactor includes:
      a first pair of electrical terminals separated from each other by a first circuit gap in a first circuit path extending between the voltage bus rail and the electrode terminal of the battery pack;
      a second pair of electrical terminals separated from each other by a second circuit gap in a second circuit path between the voltage bus rail and the electrode terminal of the battery pack; and
      a contactor arm having a longitudinal axis, wherein the contactor arm is configured, in response to a corresponding switch activation signal, to translate in an orthogonal direction with respect to the longitudinal axis between a first ON state position in which the contactor arm closes the first circuit gap to connect the voltage bus rail to the electrode terminal through the first circuit path, an OFF state position between the first circuit path and the second circuit path in which the first circuit gap and the second circuit gap remain open, and a second ON state position in which the contactor arm closes the second circuit gap to connect the voltage bus rail to the electrode terminal through the second circuit path.

2. The battery system of claim 1, wherein the first circuit path and the second circuit path are parallel to each other.

3. The battery system of claim 1, wherein the electrode terminal is a positive/cathode terminal of the battery pack and the voltage bus rail is a positive voltage bus rail of a high-voltage bus.

4. The battery system of claim 1, wherein the first pair of electrical terminals and the contactor arm together form a pre-charge switch within the battery pack.

5. The battery system of claim 1, wherein the battery pack has a voltage capability of at least 400V.

6. The battery system of claim 1, wherein the battery system is a multi-pack battery system, the battery pack is a first battery pack, and the three-state contactor is a first three-state contactor connected to the first battery pack, and wherein the battery system further comprises a second battery pack and a second three-state contactor connected between the voltage bus rail and an electrode terminal of the second battery pack.

7. The battery system of claim 6, further comprising a plurality of high-voltage electrical switches, inclusive of the first three-state contactor and the second three-state contactor, wherein the plurality of high-voltage electrical switches is collectively configured to selectively interconnect the first battery pack and the second battery pack in a series arrangement and a parallel arrangement to thereby establish a series configuration (S-configuration) and a parallel configuration (P-configuration) of the battery system, respectively.

8. The battery system of claim 7, wherein the battery system, inclusive of the first three-state contactor and the second three-state contactor, has a total of eight high-voltage electrical switches.

9. The battery system of claim 8, further comprising a controller coupled to the eight high-voltage switches and configured, in response to a battery mode selection signal, to selectively control a respective ON/OFF state of each of the eight high-voltage switches to transition the multi-pack battery system from the S-configuration to the P-configuration, or vice versa.

10. The battery system of claim 9, wherein the first battery pack and the second battery pack each has a corresponding voltage of about 400-500V or more, such that the battery system when in the S-configuration has a voltage capability of about 800-1000V or more.

11. The battery system of claim 1, further comprising a direct current (DC) charge connector configured to connect the battery pack to an offboard charging station during a predetermined DC fast-charging event.

12. An electric powertrain comprising:
a mechanical load;
an electrical load, including a power inverter module and a rotary electric machine, wherein the rotary electric machine is connected to the power inverter module and is coupled to the mechanical load; and
a battery system connected to and configured to power the electrical load, the battery system comprising:
a voltage bus having a voltage bus rail;
a battery pack having an electrode terminal;
a charging port configured to connect the battery pack to an offboard charging station during a predetermined fast-charging event; and
a three-state contactor positioned between the electrode terminal and the voltage bus rail, wherein the three-state contactor includes:
a first pair of electrical terminals separated from each other by a first circuit gap in a first circuit path extending between the voltage bus rail and the electrode terminal of the battery pack;
a second pair of electrical terminals separated from each other by a second circuit gap in a second circuit path between the voltage bus rail and the electrode terminal of the battery pack, wherein the second circuit path is parallel to the first circuit path; and
a contactor arm having a longitudinal axis, wherein the contactor arm is configured, in response to a corresponding switch activation signal, to translate in an orthogonal direction with respect to the longitudinal axis between a first ON state position in which the contactor arm closes the first circuit gap to connect the voltage bus rail to the electrode terminal through the first circuit path, an OFF state position between the first circuit path and the second circuit path in which the first circuit gap and the second circuit gap remain open, and a second ON state position in which the contactor arm closes the second circuit gap to connect the voltage bus rail to the electrode terminal through the second circuit path.

13. The electric powertrain of claim 12, wherein the first pair of electrical terminals and the contactor arm together form a pre-charge switch of the battery pack.

14. The electric powertrain of claim 12, wherein the mechanical load includes one or more road wheels of a motor vehicle.

15. The electric powertrain of claim 12, wherein the battery system is a multi-pack battery system in which the battery pack is a first battery pack and the three-state contactor is a first three-state contactor connected to the first battery pack, and wherein the battery system further comprises a second battery pack and a second three-state contactor connected between the voltage bus rail and an electrode terminal of the second battery pack.

16. The electric powertrain of claim 15, wherein each of the first battery pack and the second battery pack has a respective voltage capability of at least 400V.

17. The electric powertrain of claim 15, further comprising a plurality of high-voltage electrical switches, inclusive of the first three-state contactor and the second three-state contactor, wherein the plurality of high-voltage electrical switches is collectively configured to selectively interconnect the first battery pack and the second battery pack in a series arrangement and a parallel arrangement to thereby establish a series configuration (S-configuration) and a parallel configuration (P-configuration) of the battery system, respectively.

18. The electric powertrain of claim 17, further comprising a controller coupled to the high-voltage switches and configured, in response to a battery mode selection signal, to selectively control a respective ON/OFF state of each of the eight high-voltage switches to transition the multi-pack battery system from the series battery configuration to the parallel battery configuration, and vice versa.

19. A three-state contactor for use within an electrical system having a battery pack and a voltage bus rail, the three-state contactor comprising:
a first pair of terminals separated from each other by a first circuit gap in a first circuit path extending, when the three-state contactor is in an installed position of the electrical system, between the voltage bus rail and an electrode terminal of the battery pack;
a second pair of terminals separated from each other by a second circuit gap in a second circuit path extending, when the three-state contactor is in the installed position, between the voltage bus rail and the electrode terminal of the battery pack; and
a contactor arm having a longitudinal axis, wherein the contactor arm is configured, in response to a corresponding switch activation signal, to translate in an orthogonal direction with respect to the longitudinal axis between a first ON state position in which the contactor arm closes the first circuit gap to connect the voltage bus rail to the electrode terminal through the first circuit path, an OFF state position between the first circuit path and the second circuit path in which the first circuit gap and the second circuit gap remain open, and a second ON state position in which the contactor arm closes the second circuit gap to connect the voltage bus rail to the electrode terminal through the second circuit path.

20. The three-state contactor of claim 19, wherein the first circuit path and the second circuit path are parallel to each other.

\* \* \* \* \*